Sept. 19, 1950  W. F. HORSTMAN  2,523,022
REINFORCED ASBESTOS TAPE AND PROCESS OF MAKING SAME
Filed Dec. 31, 1949
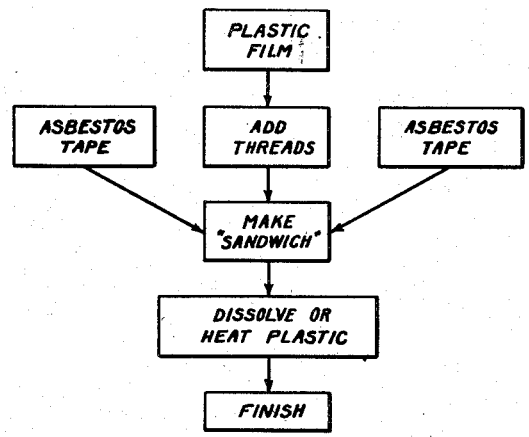
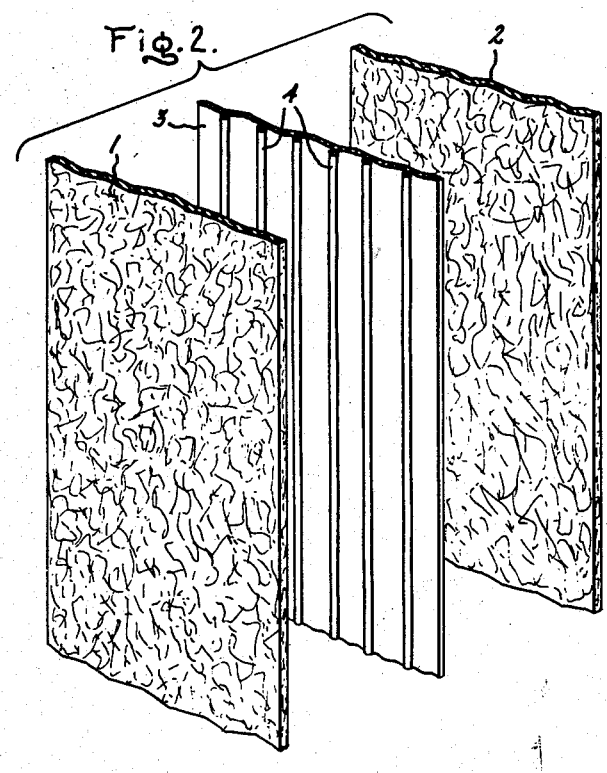
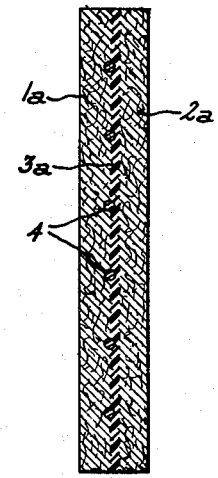
Inventor:
Walter F. Horstman,
by *[signature]*
His Attorney.

Patented Sept. 19, 1950

2,523,022

UNITED STATES PATENT OFFICE 2,523,022

REINFORCED ASBESTOS TAPE AND PROCESS OF MAKING SAME

Walter F. Horstman, York, Pa., assignor to General Electric Company, a corporation of New York Application December 31, 1949, Serial No. 136,213

6 Claims. (Cl. 154—2.6)

My invention relates to heat-resistant electrical insulating tape in the nature of asbestos tape. More particularly my invention is concerned with the physical reinforcement of asbestos tape so that it may stand greater abuse without affecting its electrical properties. The method or process of applying the reinforcement to the tape is also considered to be part of my invention.

Insulating tape, made of felted asbestos fibers, is well known and widely used in the electrical industry. Such tape has the advantages of cheapness, lightness, flexibility, chemical inertness and heat resistance as well as its insulating properties. However, ordinary asbestos tape is far from strong, and it will not withstand much twisting, bending or pulling without breaking or tearing. Various reinforcements can be added to the tape, but these have usually lacked the heat-resistance, electrical insulating or other properties of the original tape or have been difficult or expensive to incorporate in the tape structure. One object of my invention is to add a reinforcement to asbestos tape without decreasing the advantages of the original tape. Another object is to apply the reinforcement in such a manner that it is in the best position for adding strength, and is easily and firmly secured in that position.

Other objects and the details of that which I believe to be novel and my invention will be clear from the following description and claims taken with the accompanying drawing in which is illustrated the steps of an exemplary process for making my improved reinforced asbestos tape and an example of the tape according to my invention during various stages of manufacture.

In the drawing, Fig. 1 is a "flow" chart or diagram indicating the various elements used and the steps followed in manufacturing a tape according to my invention; Fig. 2 is a larger-than-normal exploded perspective view of segments of the elements of my tape in one stage of manufacture, and Fig. 3 is a transverse cross-section of a completed tape according to my invention, on a still larger scale.

A finished asbestos tape according to my invention has incorporated therein a number of continuous filament glass yarn threads. These threads preferably extend longitudinally of the tape and are firmly embedded therein, at regular spaced intervals across the width of the tape. The process of manufacture insures the proper positioning of the threads in the tape and firm bonding of the threads to the asbestos in the tape. Because the process of making the tape is so intimately associated with the final product, both process and product will be described together and claimed in this application.

To begin with, two unimpregnated felted asbestos sheets 1 and 2 are made, each of several times the width as the desired finished tape, but of only about half the thickness of the finished product. These wide sheets will be slit longitudinally into tapes of the desired width after completion of all processing, and therefore they may be regarded as tape sheets, or tapes.

A thin plastic film or sheet 3 is used as the carrier for the reinforcement, and this film is also in the form of a sheet approximating the width of the asbestos tape sheets. I have found that acetate film is satisfactory for the purpose intended, although vinyl or other thermoplastic sheet might be used. I will refer to this element as the plastic film.

Cemented, "glued," or otherwise suitably secured to the plastic film are a plurality of heat-resistant threads 4. These are preferably secured to the film so that they extend longitudinally of the tape sheet. For best results, I prefer to use continuous filament glass yarn for these threads. Cotton, rayon or nylon threads might provide suitable reinforcement, but they lack the heat-resistant and other desirable properties of the glass.

The glass threads are spaced apart across the width of the film tape, and are held in place by the film so that they may easily be handled with the plastic film during subsequent manufacturing operations. I suggest a spacing between threads of from 6 to 25 per inch across the width of the tape sheet in order to give the desired mechanical strength.

The plastic film tape, with the longitudinally extending glass threads now attached thereto, is then "sandwiched" between the two unimpregnated asbestos tapes, with the asbestos tapes on the outside. The plastic film insures that the threads are properly located between the asbestos sheets, in spaced longitudinally extending position. When the asbestos tapes are applied, these hold the plastic film between them, and therefore determine the final location of the threads.

The next step in the process is to "melt" the plastic film, so that the film no longer exists as such, and so that the asbestos tapes and the reinforcing glass threads are firmly bonded together. If the preferred acetate film is used for the plastic tape, it may be "melted" by immersing the sandwiched tape in acetone, which will penetrate the asbestos and will firmly attach the glass to the asbestos through absorption of the film by the asbestos. Acetic acid may alternatively be used to "melt" the acetate film, but the tape should thereafter be thoroughly rinsed if the electrical characteristics are not to be impaired. Similarly, bonding can be obtained with other plastic films, such as various thermoplastics, by applying heat to soften the film while it is sandwiched between the asbestos sheets. The sheets may be run through extra compression rolls, or not, depending upon the finished appearance desired, it being understood that in any case the asbestos tapes are pressed together sufficiently to hold the glass threads in position while the plastic film is being melted.

When completed, a tape according to my invention might appear in cross-section as illustrated in Fig. 3 of the drawing. In this more or less diagrammatic view, 1a indicates that part of the completed tape which was originally asbestos tape 1; part 2a is the area corresponding to original asbestos tape 2; the central section 3a shows the original location of the plastic film 3 which is now absorbed in the asbestos, and 4 indicates the unchanged reinforcing threads now bonded firmly in the completed tape.

After completion of the tape as described above, various compounds or treatments may be applied to finish the tape as is customary and desirable. Such qualities as electrical resistance, moisture resistance, flame and heat resistance may be improved in the usual finishing step. Such processes as calendering, sizing, and trimming may also be desirable. The tape sheets may be slit into individual tapes of desired final width.

An asbestos tape, reinforced in the manner above described, has been found to have increased tensile strength over an equivalent size and quality of plain asbestos tape without this reinforcement. The desirable qualities found in the plain tape were not impaired in the tape reinforced according to my invention.

As will be evident from the foregoing description, certain aspects of my invention are not limited to the particular details of the example illustrated, and I contemplate that various and other modifications and applications of the invention will occur to those skilled in the art. It is therefore my intention that the appended claims shall cover such modifications and applications as do not depart from the true spirit and scope of my invention.

What I claim as new and desire to secure by Letters Patent of the United States is:

1. A process for making a reinforced asbestos tape from a pair of unimpregnated asbestos tapes, a plastic film tape and a plurality of continuous filament glass yarn threads, said process comprising, in order, the steps of securing said glass yarn threads to said plastic tape in longitudinally extending direction, positioning said asbestos tapes on either side of said plastic tape, and holding said plastic tape by and between said asbestos tapes while melting said plastic tape, whereby said plastic film is absorbed in the asbestos tapes and bonds said asbestos tapes and said glass threads together into a completed reinforced asbestos tape.

2. In a process for manufacturing an asbestos tape reinforced by glass yarn threads which are bonded to the asbestos by a plastic, the steps of forming a tape film of said plastic, securing a plurality of said glass threads to the tape film in spaced relation from one another across said tape and extending longitudinally of the tape, then applying a felted asbestos tape to each side of the tape film and finally melting said plastic while holding said glass threads by and between said asbestos tapes.

3. A process for making a reinforced asbestos tape from a pair of asbestos tapes, a plastic film tape and a plurality of glass yarn threads, said process comprising the steps of securing said glass yarn threads to said plastic tape, positioning said asbestos tapes on either side of said plastic tape, and holding said plastic tape and glass threads between said asbestos tapes and in contact therewith while melting said plastic tape.

4. A reinforced asbestos tape comprising two outer layers of felted asbestos, a plurality of glass threads extending longitudinally of the tape between said asbestos layers, and a plastic bonding said layers together and said threads between said layers.

5. A reinforced asbestos tape comprising two outer layers of unimpregnated felted asbestos, a plurality of continuous filament glass yarn threads between said asbestos layers, and acetate plastic bonding said layers together and said threads between said layers.

6. A reinforced asbestos tape comprising outer layers of felted asbestos tape between which are a plurality of glass yarn threads extending longitudinally of the tape, said glass yarn threads being bonded to said asbestos, and said asbestos layers being bonded to each other, by an acetate film which has been absorbed by the asbestos.

WALTER F. HORSTMAN.

REFERENCES CITED

The following references are of record in the file of this patent:

UNITED STATES PATENTS

| Number | Name | Date |
|---|---|---|
| 1,211,443 | Heany | Jan. 9, 1917 |
| 1,446,094 | Jackson | Feb. 20, 1923 |
| 1,503,337 | Seigle | July 29, 1924 |
| 1,955,083 | Muller | Apr. 17, 1934 |
| 1,970,755 | Knoll | Aug. 21, 1934 |
| 2,107,901 | Obermaier | Feb. 8, 1938 |
| 2,422,969 | Johns | June 24, 1947 |